United States Patent
Sethy et al.

(10) Patent No.: US 7,739,286 B2
(45) Date of Patent: Jun. 15, 2010

(54) TOPIC SPECIFIC LANGUAGE MODELS BUILT FROM LARGE NUMBERS OF DOCUMENTS

(75) Inventors: Abhinav Sethy, Los Angeles, CA (US); Panayiotis Georgiou, La Crescenta, CA (US); Shrikanth Narayanan, Santa Monica, CA (US)

(73) Assignee: University of Southern California, Los Angeles, CA (US)

( * ) Notice: Subject to any disclaimer, the term of this patent is extended or adjusted under 35 U.S.C. 154(b) by 312 days.

(21) Appl. No.: 11/384,226

(22) Filed: Mar. 17, 2006

(65) Prior Publication Data

US 2006/0212288 A1   Sep. 21, 2006

Related U.S. Application Data

(60) Provisional application No. 60/663,141, filed on Mar. 17, 2005.

(51) Int. Cl.
- *G06F 7/00* (2006.01)
- *G06F 17/28* (2006.01)
- *G06F 17/30* (2006.01)
- *G10L 15/00* (2006.01)

(52) U.S. Cl. .......................... 707/737; 704/4; 704/231; 707/748

(58) Field of Classification Search ................ 704/244, 704/4, 231, 245; 707/4, 737, 748, 749, 767, 707/999.004

See application file for complete search history.

(56) References Cited

U.S. PATENT DOCUMENTS

| | | | |
|---|---|---|---|
| 6,418,431 B1 * | 7/2002 | Mahajan et al. ............... 707/4 |
| 6,430,551 B1 * | 8/2002 | Thelen et al. .................. 707/3 |
| 6,990,628 B1 * | 1/2006 | Palmer et al. ............... 715/234 |
| 7,406,458 B1 * | 7/2008 | Carson et al. ................. 707/3 |
| 2003/0046263 A1 * | 3/2003 | Castellanos et al. ........... 707/1 |
| 2004/0254920 A1 * | 12/2004 | Brill et al. ..................... 707/3 |
| 2005/0010556 A1 * | 1/2005 | Phelan ......................... 707/3 |

OTHER PUBLICATIONS

I. Carp, J. Yamron, L. Gillick, S. Lowe, and P. van Mulbregt, "Topic Tracking in a News Stream," Proceedings of the DARPA Broadcast News Workshop, 133-138, 1999.*

Zhao, J. "The impact of cross-entropy on language modeling," PhD thesis, Mississippi State University, 1999.*

(Continued)

*Primary Examiner*—James Trujillo
*Assistant Examiner*—Jorge A Casanova
(74) *Attorney, Agent, or Firm*—Fish & Richardson P.C.

(57) ABSTRACT

Forming and/or improving a language model based on data from a large collection of documents, such as web data. The collection of documents is queried using queries that are formed from the language model. The language model is subsequently improved using the information thus obtained. The improvement is used to improve the query. As data is received from the collection of documents, it is compared to a rejection model, that models what rejected documents typically look like. Any document that meets the test is then rejected. The documents that remain are characterized to determine whether they add information to the language model, whether they are relevant, and whether they should be independently rejected. Rejected documents are used to update the rejection model; accepted documents are used to update the language model. Each iteration improves the language model, and the documents may be analyzed again using the improved language model.

14 Claims, 1 Drawing Sheet

OTHER PUBLICATIONS

Callan, J. Si, L. Ogilvie, P. Jin, R. "A Language Modeling Framework for Resource Selection and Results Merging," Proceedings of the Eleventh International Conference on Information and Knowledge Management, Nov. 4-9, 2002.*

Berger, A., et al., "Just-In-Time Language Modelling," *Proceedings of the 1998 IEEE International Conference on Acoustics, Speech and Signal Processing*, vol. 2, pp. 705-708, May 1998.

Bulyko, I., et al., "Getting More Mileage from Web Text Sources for Conversational Speech Language Modeling using Class-Dependent Mixtures," *Proceedings of HLT-NAACL*, vol. 2, pp. 7-9, (2003).

Mahajan, M., et al., "Improved Topic-Dependent Language Modeling using Information Retrieval Techniques," *Proceedings IEEE International Conference on Acoustics, Speech, and Signal Processing (ICASSP)*, vol. 1, pp. 541-544, Mar. 1999.

Sethy, A., et al., "Building Topic Specific Language Models from Webdata Using Competitive Models," *Interspeech-2005*, Lisbon, Portugal, pp. 1293-1296, Sep. 2005.

International Search Report and Written Opinion dated Jun. 20, 2008, for PCT Application No. PCT/US06/10049, filed Mar. 17, 2006, 16 pages.

\* cited by examiner

TOPIC SPECIFIC LANGUAGE MODELS BUILT FROM LARGE NUMBERS OF DOCUMENTS

CROSS-REFERENCE TO RELATED APPLICATIONS

This application claims priority to U.S. provisional application Ser. No. 60/663,141, filed on Mar. 17, 2005. The disclosure of the prior application is considered part of (and is incorporated by reference in) the disclosure of this application.

FEDERALLY SPONSORED RESEARCH OR DEVELOPMENT

The invention was made with government support under Grant No. N66001-02-C-6023 awarded by DARPA. The government has certain rights in the invention.

BACKGROUND

Natural language processing (NLP) systems, such as speech recognition, machine translation, or other text to text applications, typically rely on language models to allow a machine to recognize speech. The performance of these systems can be improved by customizing the model for a specific domain and/or application. A typical way of forming such a model is to base the model on text resources. For example, a model for a specific domain may be based on text resources that are specific to that domain.

Sometimes, text for a target domain might be available from an institution, that maintains a repository of texts, such as NIST or LDC. Other times, the data is simply collected manually.

Manual collection of data may be very difficult, and may add to system turnaround time and cost. Moreover, the amount of available data for a specific domain may be quite limited. In order to limit the effects of minimal domain specific data, a topic independent language model is often merged with a topic-specific language model generated from the limited in-domain data. This operation may form a hybrid model. The hybrid model may be smoothed to form a final topic specific language model.

This approach, however, is often less accurate compared to an approach where effective amounts of in-domain data are available.

SUMMARY

The present application describes a technique of using a publicly available network, such as the World Wide Web, to automatically gather data for building domain specific language models. Data is gathered that includes usable parts mixed with unusable parts. The gathered data is characterized and weighted according to its usability and relevance.

DETAILED DESCRIPTION

Figure 1:
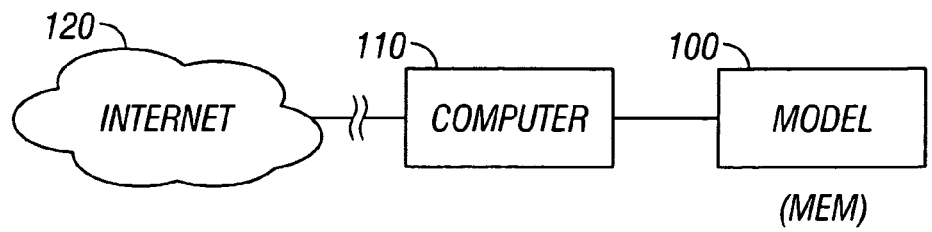
FIG. 1 shows a block diagram of a machine used to form and use the model.

The amount of data that is available and indexed on the World Wide Web is immense. More than 10 billion pages have been indexed by Google alone. However, each web page may typically have data related to many different topics and actions, e.g., links, advertisements and others. It may be a challenge to access clean text that is relevant to a particular application.

The techniques disclosed herein make use of a query based search engine to retrieve documents for a specific domain. A collection of documents can be the Internet, or can be any large database, e.g., a database with 10,000 or more documents; or 100,000 or more documents. Examples of databases which can be used to provide such documents may include news archives, corporate e-mail or other e-mail databases, corporate documents, medical histories, and any other collection of documents. Query based search engines retrieve documents which contain the specific query terms that were requested. Even though the document might contain the query terms of interest, the document might not be useful overall for modeling the domain of interest. In reality, large sections of the returned documents may not be relevant to the particular task. The embodiment describes classifying the documents according to multiple different techniques. The sections which are not relevant are considered as noise. The retrieved data is then selectively weighted to maximize the gain of the relevant parts. The techniques described herein are intended to be used with documents obtained from the Web, which is described as the embodiment. However, it should be understood that the same techniques can be used with any documents of any type, where it is expected that parts of the document will be relevant, and other parts of the document will be partly or wholly irrelevant.

The obtained set of documents for a domain of interest can then be used as an update to an already existing language model. This may be used in cases where an existing speech recognition system handles new content, in applications such as broadcast news applications. However, if the set of documents is too small to support building a robust language model, then the new data may be higher weighted.

An initial topic model represents the topic of the item being trained. A generic, topic independent language model and corresponding documents on which it is built, are also contemplated as an alternative embodiment.

Two language models are used, one is topic dependent, and the other is topic independent or a background model. The models are used to generate speech queries using the relative entropy measure. The queries are used on the Internet to return downloaded data.

The downloaded data from those speech queries is weighted at the utterance level, using a soft clustering technique. The weighting is used to create a rejection model. The rejection model is used to determine "documents", that is, collections of information, that should be rejected as a whole. Hence, this system classifies the information in two different ways: at the document level, and at some level of word cluster less than the document level, called the utterance level. the different levels may include phrases, words, sentences, subsets of sentences or clusters of sentences as well as complete documents.

Low-scoring downloaded Web data helps reject the spurious text. Other documents associated with the retrieved documents, such as in line advertisements, and cross links, may also be rejected.

A first test reviews the documents at the utterance level, that is, by phrases that are somehow matched together. Utterance processing may be supplemented using document classification techniques such as TFIDF and naïve Bayes to generate query words and provide document level weights.

FIG. 1 illustrates a computer system which may be used to form the model. Computer 110 accesses the Internet 120, to form the model 100 within a memory. The memory may be internal to or external to the computer.

Figure 2:
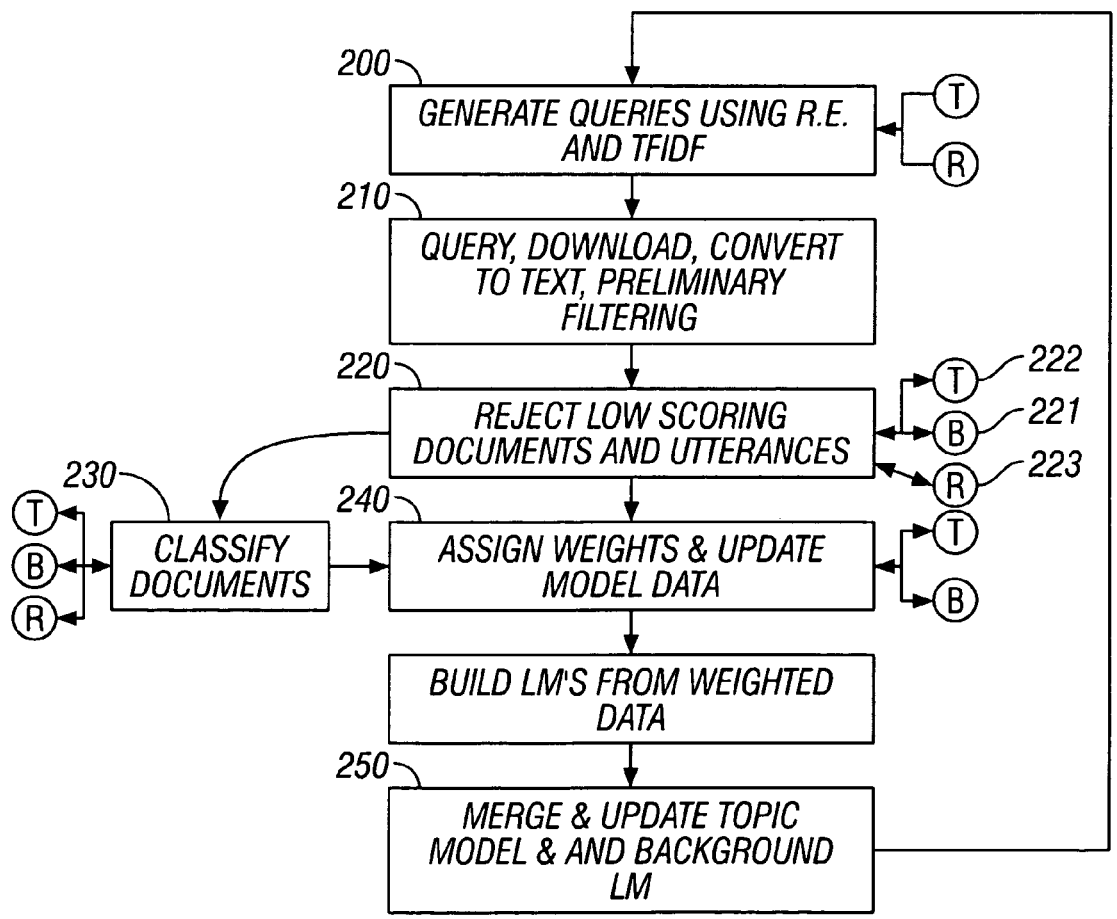
FIG. 2 shows a flowchart of operation.

The computer 110 operates according to the flowchart of FIG. 2. 200 represents the computer generating queries to the Internet 120. The queries are generated by comparing the topic language module with the background language model. The comparison may use relative entropy computation. For example, the relative entropy computation between two discrete distributions may compare densities across all the possible symbols in the alphabet. A direct relative entropy implementation for an n-gram language model would require $V^n$ computations, where V is the vocabulary size. Unfortunately, this direct implementation would make even medium-size trigram language models (15-20,000 words) computationally prohibitive.

Real world n-gram language models may be conceptualized as tree structures. A majority of the densities of those n-gram models may be reduced to probabilities corresponding (n−1) grams. This makes it possible to compute the relative entropy between two language models in O(L) computations, where L is the number of language model terms actually present in the two language models. The techniques described in "measuring convergence . . . " recursively calculates the relative entropy for an n-gram model using the relative entropy for the n−1 gram model. The computation provides relative entropy conditioned on word sequence histories h, the relative entropy between the n-grams represented by p(x|h) and q(x|h), where h is the history on which a probability of seeing the word x is conditioned, p is the based topic model language model and q is the background language model being evaluated with respect to p.

Histories with large relative entropies form the best candidates for becoming key phrases or keywords. These histories have been found to have good discriminative power. Analysis of p(h) can be analyzed to ensure that it is higher than the corresponding q(h), to verify qualification as keywords or phrases.

An embodiment is described herein, modeling language for movies. In the movie model, some key phrases are relevant, phrases such as "the movie", "on screen", "the characters". However, many key phrases contain functional words such as "is great" or "at times". These query phrases may be useful on their own, but may be more effective when combined with keywords. For example, "is great"+"actor" may be effective queries.

FIG. 2 shows a flowchart of the operation. At 200, a list of query key phrases and keywords is generated using the language model. This is described herein. Importantly, as the language model improves from these techniques, the queries also improve. A keyword list generated based on the information between words and class labels using a document classification system is also generated. The key phrases and keywords are merged with the keyword list.

In the embodiment, a random selection of five query words, with a few randomly chosen key phrases is used as the search query. The queries are sent to Google's SOAP API. A relevant set of URLs are returned. The query itself is a mix of keywords and key phrases, and the mix may be individualized based on the task at hand. For example, conversational styles may use more key phrases than keywords.

The URLs are downloaded and converted to text. This operation is generically shown as 210.

At 220, each of the utterances receive likelihood scores and low scoring documents and utterances are rejected.

Downloaded data from the World Wide Web includes substantial amounts of unusable information, including, as described above, advertising, links and embedded subsections from other content within the otherwise-relevant content. These items typically add undesired terms to the vocabulary, and may have a detrimental effect on the performance of the language model.

The rejection model is initialized in the first iteration of data downloads. The rejection model 220 subsequently rejects information based on this model.

Documents whose scores are very low compared to an average document score for the background and topic model are classed as being rejected. A language model is built based on the rejected documents. Subsequent iterations are then classify the documents as to their closeness to rejected documents. Utterances with high likelihood matched to the rejection language model are included within the rejection model. The model may also include domain information for rejection, e.g., a list of bad domains, such as URLs and Web domains that result in large sets of rejected documents. This may form a block list that rejects future downloads. Conversely, a green list may be formed based on web sites with high scores that may be marked as potential sources for so-called blind recursive crawling of data.

The rejection model helps maintain a clean vocabulary and removes noise from the training cycle.

The likelihood scores are calculated using background ("B") 221, topic ("T") 222 and rejection ("R") 223 language models. 220 determines if the utterance scores high on the rejection model, or if the utterance has low scores on both background and topic models with respect to the average. If there is either a high score from the rejection model, or a low background and topic score, then the document or utterance is rejected.

Otherwise, at 230, the classification and relevance weights for the utterance are calculated according to $$\text{score}(T) = \frac{P(utt/T) * DW(T)}{P(utt/T) * DW(T) + P(utt/B) * DW(B)} \quad (1)$$

$$\text{score}(B) = \frac{P(utt/B) * DW(B)}{P(utt/T) * DW(T) + P(utt/B) * DW(B)} \quad (2)$$

T:Topic Model

B:Background Model

DW(T):Document weight for topic

DW(B):Document weight for background

A document level weight is also obtained as explained herein. The document level weight is included as a trade-off between the relevance of the entire document and that of the given utterances.

The utterances as weighted in this way, are grouped into a number of bins according to their weight for the topic model and the background. The binned data is then used create language models. These are combined according to their assigned weights to create an update topic model and an update background model.

The update models are subsequently merged with the initial models, using a merged weight that is determined by iterative perplexity minimization on a handout set. The new data is added to the model at 250, and hence the training set is enhanced at each iteration as new downloaded documents are included.

The document classification system may classify documents to correspond to topic, background or rejected data. These classifications may then be used to train a document classification system. The training may use the TFIDF/Naive Bayes measure, included in the CMU BOW tookit. The document weights are used in conjunction with the utterance weights that have been calculated at 240. Document weights are calculated for each of the background class, the topic class and the rejection class. Moreover, mutual information between the background, topic and rejection class labels are used to select keywords using the relative entropy measure. The keyword selection process chooses words which have high discrimination power for document classification and high conditional occurrence probability for the topic model.

The techniques described above, including an initial rejection of documents that meet the rejection model utterance, or have low utterance relevancy is carried out, prior to adding the document to the training set.

A simple linear interpolation model may be used for merging the Web data language module with the existing topic models. More complex techniques such as class based model interpolation can be used.

The language model may use a bin based approach as described. Alternatively, fractional counting can be used to build the language models from weighted utterances directly instead of the bin based approach.

The system is shown as an endless loop used for the iteration. For the first iteration, the system uses a dummy rejection module. A termination condition for the iteration loop can also be set.

In a specific example, the training is carried out using a system designed for movie domain related text such as movie reviews, news and the like.

Initial data for training the model is generated from the movie web site IMDB.com. A background model used an interpolated model with data from multiple different models, including SWB (4M words), WSJ (2M words), and the Gutenberg project (2M words) pruning was then used to reduce the background model to a vocabulary of about 40,000 words.

The test set is collected from a random selection of movie reviews and news from MSN, Amazon and other sites. The test noted that the query generation process worked well with as few as 20,000 words. Hence, the performance of the final merged model worked well even with small amounts of data. The final merged model is not critically dependent on the size of the seed set. Moreover, the best results were obtained with five keywords and two keyphrases, although other counts of keywords and key phrases could also be adequately used.

It was found that the rejection model removes about 8% of the downloaded documents and about 6% of the utterances from the remaining documents set in its first iteration. The rejected data size increases on subsequent iterations. By the end of the process, an average of 10% of the documents and 13% of the utterances have been reduced in all.

Finally, for data weighting, the initial seed set size of 300 words got its best performance from five weight bins, five keywords and two key phrases as the query structure, and data filtering.

Another embodiment describes an additional aspect related to whether new information really adds to the language model—the issue of distributional similarity. A technique described herein uses an incremental greedy selection scheme based on relative entropy. This technique selects information, e.g. a sentence or phrase, if and only if adding the phrase to the already selected set of information reduces the relative entropy with respect to the in-domain data distribution.

Denote the language model built from in-domain data as P and let $P_{init}$ be a language model for initialization purposes which we estimate by bagging samples from the same in-domain data. The technique is described herein using unigram probabilities. However, the disclosed technique can also be used with higher n-grams also.

Let $W_0(i)$ be a initial set of counts for the words i in the vocabulary V initialized using $P_{init}$. The count of word i in the jth sentence $s_j$ of webdata is denoted as $m_{ij}$.

Nj=summation over i of $m_{ij}$, which represents the number of words in the sentence and Nj is the summation over i of Wj(i) which is the total number of words already selected.

The relative entropy of the maximum likelihood estimate of the language model of the selected sentences to the initial model P is given by $$H(j-1) = -\sum_i P(i)\ln\frac{P(i)}{W_j(i)/N_j}$$

If we select the sentence $s_j$, the updated RE $$H(j) = -\sum_i P(i)\ln\frac{P(i)}{(W_j(i)+m_{ij})/(N_j+n_j)}$$

Direct computation of relative entropy using the above expressions for every sentence in the webdata will have a very high computational cost, since O(V) computations per sentence in the webdata would be required. The number of sentences in the webdata can be very large and can easily be on the order $10^8$ to $10^9$. The computation cost for moderate vocabularies (around $10^5$) would be very large in the order of $O(10^{14})$. If bigrams and trigrams are included, the computation becomes infeasible.

The summation H(j) can be split into $$H(j) = -\sum_i P(i)\ln P(i) ++$$

$$\sum_i P(i)\ln\frac{W_j(i)+m_{ij}}{N_j+n_j}$$

$$= H(j-1) + \underbrace{\ln\frac{N_j+n_j}{N_j}}_{T1} -$$

$$\underbrace{\sum_{i,m_{ij}\neq 0} P(i)\ln\frac{(W_j(i)+m_{ij})}{W_j(i)}}_{T2}$$

Intuitively, the term T1 represents the decrease in probability mass because of adding nj words more to the corpus and the term T2 measures the in-domain distribution P weighted improvement in probability for words with non-zero mij.

The relative entropy will decrease with selection of sentence sj if T1<T2. To make the selection more refined, a condition T1+thr(j)<T2 can be used, where thr(j) is a function of j. A good choice for thr(j) is a function that declines at the same or similar rate (e.g., within 10 or 20%) as the ratio in (Nj+nj)/Nj~nj/Nj~1/kj where k is the average number of words for every sentence.

This technique becomes better in selecting the right sentences as the size of the already selected corpus, Nj, increases and the relative entropy H(j) decreases. The initial set of sentences selected might not be as useful or relevant to the task. However, after doing one round of selection from the webdata, the selected sentences may be re-entered into the corpus and scanned again. This simple heuristic helps to significantly reduce the bias towards selecting more in the initial part of the process. The corpus may also be randomly permuted a few times to generate more subsets.

Use of the maximum likelihood estimation for estimating the intermediate language models for W(j) may simplify the entropy calculation, which reduces the order from O(V) to O(k). However, maximum likelihood estimation of language models is relatively poor when compared to smoothing based estimation. To balance the computation cost and estimation accuracy, the counts W (j) may be modified, e.g., by using Kneyser-Ney smoothing periodically after fixed number of sentences. The general structure and techniques, and more specific embodiments which can be used to effect different ways of carrying out the more general goals are described herein.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, this system can be used for other text-to-text applications, including automated summarization, or to any other application that uses a natural language model.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

The processing described herein is carried out on a computer. The computer may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop. The programs may be written in C, or Java, Brew or any other programming language. The programs may be resident on a storage medium, e.g., magnetic or optical, e.g. the computer hard drive, a removable disk or media such as a memory stick or SD media, or other removable medium. The program may also be run a network, for example, with a server or other machine sending signals to the local machine, which allows the local machine to carry out the operations described herein.

What is claimed is:

1. A method, comprising:
   (a) generating, by a computer system, a plurality of queries based on a topic language model including content specific to a topic of interest and a background language model including content specific to the topic of interest and general content, the plurality of queries specific to the topic of interest;
   (b) querying, by the computer system, a large database of documents using the plurality of queries;
   (c) receiving, by the computer system, responsive to said querying, a plurality of documents that satisfy the plurality of queries;
   (d) classifying, by the computer system, each of the received plurality of documents to assign a respective document score indicating a relevance of a document to the plurality of queries;
   (e) including, by the computer system, one or more documents of the plurality of documents in a rejection model, wherein each of the one or more documents in the rejection model have a document score less than an average document score for the plurality of documents, wherein each of the one or more documents in the rejection model are less likely to satisfy the plurality of queries compared to remaining documents of the plurality of documents;
   (f) updating, by a computer system, the topic language model and the background language model based on documents of the plurality of documents that have not been rejected by the rejection model; and
   (g) iterating, by a computer system, steps (a), (b), (c), (d), (e), and (f) by replacing the topic language model and the background language model with the updated topic language model and the updated background language model, respectively,
   wherein each of the plurality of documents are scored at an utterance level to assign an utterance score for an utterance based on the topic language model, the background model, document weight for the tonic and document weight for the background, wherein an utterance includes a plurality of word clusters, each word cluster including one or more words, each document includes one or more utterances, a respective score for each document obtained based on scores of utterances in the document.

2. A method as in claim 1, wherein said querying comprises comparing the topic language model with the background language model using relative entropy computation.

3. A method as in claim 1, further comprising using updated topic language model to form new queries.

4. A method as in claim 3, wherein said generating further comprises using a background model which is generic to a plurality of topics, and a topic specific model, which is specific to a specified topic.

5. A method as in claim 1, wherein the plurality of documents include a plurality of word clusters, each word cluster including one or more words, and wherein documents that are not rejected by the rejection model include more word clusters that satisfy the plurality of queries and less word clusters that do not satisfy the plurality of queries.

6. A method as in claim 1, wherein said large database of documents is the Internet.

7. A method, comprising:
   accessing, by a computer system, a plurality of documents which includes some documents that include information about a topic and other documents that do not include information about said topic;
   comparing, by the computer system, the information from said documents to a rejection model which represents a model of information that is not sufficiently relevant to said topic to use as a language model for said topic;
   rejecting, by the computer system, information which is not sufficiently relevant; and using information which is sufficiently relevant for said language model;
   updating, by the computer system, the rejection model by including the information which is not sufficiently relevant to information already included in the rejection model; and iterating, by the computer system, the accessing, the comparing, the rejecting, and the updating to generate an updated language model to replace the language model for said topic wherein the rejection model is generated by:

classifying, by the computer system, information from said documents based on a relevance of each document to the topic, wherein each document is assigned a respective document score indicating the relevance, and including, by the computer system, information from said documents in a rejection model, wherein the included information includes documents that are less likely to be relevant to the topic compared to remaining documents, wherein a document is determined to be less likely to the topic when a document score for the document is less than an average document score of all said documents, and wherein said language model includes a background language model, representative of a topic independent model, and a topic language model representative of the topic, and wherein each of the plurality of documents are scored at an utterance level to assign an utterance score for an utterance based on the language model, the background model, document weight for the topic and document weight for the background, wherein an utterance includes a plurality of word clusters, each word cluster including one or more words, each document includes one or more utterances, a respective score for each document obtained based on scores of utterances in the document.

8. A method as in claim 7, further comprising using said language model to form a query which queries the Internet, and using responses from said query as documents used by said obtaining.

9. A method as in claim 8, further comprising forming a list of Internet sites based on said rejecting, and rejecting use of Internet sites that are on said list.

10. A method as in claim 9, wherein said forming comprises identifying queries and web addresses URLS which provide data for improving the language model, by measuring the gains in model at each of a plurality of iterations.

11. A method as in claim 7, further comprising weighting parts of the documents according to relevance to the topic, the weighting comprising assigning a weight to each part in each document, the weight based on the language model, the part, and a document weight for topic corresponding to each document, the document weight for topic representing a comparison of a relevance of the document and a relevance of the part of the document to a plurality of search queries, one or more of which the document satisfies.

12. A method as in claim 7, wherein said comparing comprises determining a relative entropy comparison of the background model and the topic model.

13. A method as in claim 7, further comprising using said language model for speech recognition.

14. A method, comprising:

accessing, by a computer system, a plurality of documents which includes some documents that include information about a tonic and other documents that do not include information about said topic;

comparing, by the computer system, the information from said documents to a rejection model which represents a model of information that is not sufficiently relevant to said tonic to use as a language model for said topic;

rejecting, by the computer system, information which is not sufficiently relevant; and using information which is sufficiently relevant for said language model;

updating by the computer system, the rejection model by including the information which is not sufficiently relevant to information already included in the rejection model; and iterating by the computer system, the accessing, the comparing, the rejecting, and the updating to generate an updated language model to replace the language model for said topic, wherein the rejection model is generated by:

classifying, by the computer system, information from said documents based on a relevance of each document to the topic, wherein each document is assigned a respective document score indicating the relevance, and including, by the computer system, information from said documents in a rejection model, wherein the included information includes documents that are less likely to be relevant to the tonic compared to remaining documents, wherein a document is determined to be less likely to the tonic when a document score for the document is less than an average document score of all said documents, wherein said comparing compares both documents as a whole and also compares utterances within the documents, a document as a whole including all word clusters in the document, an utterance within a document including less than all word clusters within the document, a word cluster including one or more words.

\* \* \* \* \*

UNITED STATES PATENT AND TRADEMARK OFFICE
CERTIFICATE OF CORRECTION

PATENT NO.         : 7,739,286 B2                                              Page 1 of 1
APPLICATION NO. : 11/384226
DATED              : June 15, 2010
INVENTOR(S)        : Abhinav Sethy et al.

It is certified that error appears in the above-identified patent and that said Letters Patent is hereby corrected as shown below:

Column 8, line 26, change "tonic" to -- topic --.
Column 9, line 4, change "topic" to -- topic, --.
Column 10, line 11, change "tonic" to -- topic --;
              line 16, change "tonic" to -- topic --;
              line 20, change "updating" to -- updating, --;
              line 24, change "iterating" to -- iterating, --;
              line 37, change "tonic" to -- topic --;
              line 39, change "tonic" to -- topic --.

Signed and Sealed this

Nineteenth Day of October, 2010

David J. Kappos
*Director of the United States Patent and Trademark Office*